United States Patent [19]

Braun et al.

[11] 4,301,913

[45] Nov. 24, 1981

[54] CHAIN SCRAPER CONVEYOR CHUTE

[75] Inventors: Ernst Braun; Gert Braun, both of Essen-Heisingen, Fed. Rep. of Germany

[73] Assignee: Halbach & Braun, Fed. Rep. of Germany

[21] Appl. No.: 115,897

[22] Filed: Jan. 28, 1980

[30] Foreign Application Priority Data

Feb. 7, 1979 [DE] Fed. Rep. of Germany ....... 2904575

[51] Int. Cl.[3] ............................................. B65G 19/28

[52] U.S. Cl. ....................................... 198/735; 299/43

[58] Field of Search ....................... 198/735, 860, 861; 299/32, 34, 43; 138/165-166, 162; 174/101

[56] References Cited

FOREIGN PATENT DOCUMENTS 1950916 9/1971 Fed. Rep. of Germany ........ 299/43

*Primary Examiner*—Robert B. Reeves

*Assistant Examiner*—Douglas D. Watts

*Attorney, Agent, or Firm*—McGlew and Tuttle

[57] ABSTRACT

A conveyor chute for chain scraper conveyors which are adapted to overlie a floor of a mining seam, comprises, at least one chute section which has laterally spaced apart upright sidewalls located on a filling and forehead side of the conveyor. The bottom plate extends between the sidewalls and divides the chute section into upper and lower stringers. A forehead side of the chute has a chute foot which has a lower portion which extends laterally outwardly from its wall and has a male hinge portion on its inside face which engages with a female hinge portion which is attached to a baseplate which extends between the two sidewalls and rests on the mining seam floor. The opposite side of the baseplate may be fastened to the opposite sidewall either directly by use of an extension plate and fastening elements or with an intermediate shim therebetween.

7 Claims, 5 Drawing Figures

CHAIN SCRAPER CONVEYOR CHUTE

FIELD AND BACKGROUND OF THE INVENTION

The invention relates to conveyor devices in general and, in particular, to a new and useful conveyor chute for chain scraper conveyors.

As indicated above, the invention relates to a conveyor chute for chain scraper conveyors, in particular, single chain scraper conveyors, which comprise chute sections and a bottom plate connecting the respective sidewalls and a baseplate, with the bottom plate dividing each chute section into upper and lower stringers, and with the plate resting on the floor of the seam.

The baseplate of such conveyor chutes serves the purpose of preventing the penetration of fine coal into the lower stringer while still permitting easy chain travel. However, the baseplate is usually mounted on the chute section in such a complex manner that complicated disassembly steps are required to make the lower stringer accessible in the event of a breakdown. Actually, accessories, such as ramps, guide planks, tracer sections, base frames, or the like must be removed for this purpose, or the lower stringer must be reached through so-called windows in the bottom plate. This results in unnecessary costs and wasted labor.

SUMMARY OF THE INVENTION

The present invention provides a conveyor chute, in particular for single chain scraper conveyors, in which the baseplates are connected to the chute sections so that the lower stringer is readily accessible without complicated disassembly steps.

The present invention solves this problem in a conveyor chute of the type described above in that the sidewall on the forehead side of each chute section has a hinge projection on the chute foot which, in vertical projection, is set back under the sidewall section on the outside of the chute and, in that, the baseplate has a hinge groove on the forehead side for the hinge projection to engage it with a specified clearance, and a stop coordinated with the chute foot on the inside of the chute.

The consequences of these inventive measures is that the baseplate is jointed to the chute foot on the forehead side of the respective sidewall in hinged fashion so that the chute section, or all of the chute sections, and therefore, the entire conveyor chute, is mounted on the baseplate(s) so as to be tiltable against the face being minded. Since the hinge-like connection of the baseplate to the chute section is set back on the forehead side under the respective sidewall so as not to be beyond the vertical plane of the sidewall section, unscrewing accessories, such as the ramp, guide plank, tracer profile or the like is also unnecessary, when either the chute section is to be tilted or the baseplate removed to make the lower stringer accessible.

The stop interacting with the hinge protrusion on the sidewall takes care of automatic alignment of the sidewalls relative to each other at all times. The bottom plate connecting the sidewalls tends to bulge out, particularly after having experienced weakening, due to wear. The bulging of the bottom plate, however, is inhibited by the baseplate at least to the extent that the opposite sidewalls remain spaced a specified distance apart. Thus, perfect driver guidance in both the upper and lower stringers is assured at all times.

Other features characteristic of the invention are described in the following: The invention provides, for example, that the hinge projection be designed as a male section integrally rolled onto the sidewall and thus stiffening the sidewall, and for the hinge groove to be designed as a female section welded to the baseplate, with both sections extending over the length of the chute section. The male section, extending over the length of the chute section like a track, represents not only a hinge pin, but also a reinforcing bar for the respective sidewall.

According to the invention, the sidewall on the forehead side has, above the male section, a recess for the partial accommodation of the female section for the hinged tilting of the chute section. Thus, even when tilting the chute section, the chute profile does not extend beyond the vertical plane defined by the sidewall so that accessories screwed to the sidewall will not interfere. The same purpose is also served by the measure of providing the female section on its top side and on the forehead side with bevels tapering the section down conically. For this purpose, the stop for the chute section may extend over the length of the chute section the same as the male and female sections and be designed as a profiled bar.

The invention further provides for the baseplate to have an extension projecting beyond the vertical projection of the sidewall section on the filling side which is connectable by means of detachable fasteners to a base frame joined to the sidewall on the filling side. This also ensures perfect fixing of the baseplate on the filling side. The fasteners may involve cotter pins, locking pins and tapered shims, insertable between the extension and base frame.

The conveyor chute, according to the invention, can be set to any oblique position by means of the tapered shims. The extension may involve individual fastening plates at abutting ends of the chute sections. Preferably, the baseplates of adjacent chute sections overlap so that a closed lower stringer is also realized in the butt zones. Finally, the sidewalls of the chute sections may have additional locking means for the baseplate at their butt ends.

The advantages achieved by the invention are, in essence, that a conveyor chute for chain scraper conveyors, in particular single chain scraper conveyors is realized, the baseplate of which is characterized by its ease of assembly. In fact, the conveyor chute according to the invention can be tilted on the baseplate into any desired oblique position relative to the face being mined and, in addition, the baseplate is easy to disassemble in order to make the lower stringer accessible in the event of breakdowns.

In order to assemble and disassemble the baseplate, it is no longer necessary to unscrew the accessories screwed to the sidewalls of the chute sections. Instead, the baseplate can be easily suspended on the forehead side from the setback male hinge section by its female hinge section while the fastening means on the filling side are readily accessible. As a result, the conveyor chute with its baseplate, according to the invention, can be employed even in planing and augur machine operations.

Accordingly, it is an object of the present invention to provide a conveyor chute for chain scraper conveyors which are adapted to overlie a floor of a mining seam, which comprises, a chute section having laterally spaced apart forehead and filling sidewalls with a bottom plate extending between the sidewalls and dividing the chute section into upper and lower stringers, and with at least one forehead sidewall having a chute foot further including a baseplate extending between the sidewalls below the bottom plate and adapted to rest on the floor of the mining seam and having a pivot side adjacent the forehead sidewall which is pivotally mounted on the forehead sidewall by pivot means which are defined by a male portion of the sidewall engageable into a female pivot portion of the foot plate.

A further object of the invention is to provide a conveyor chute which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
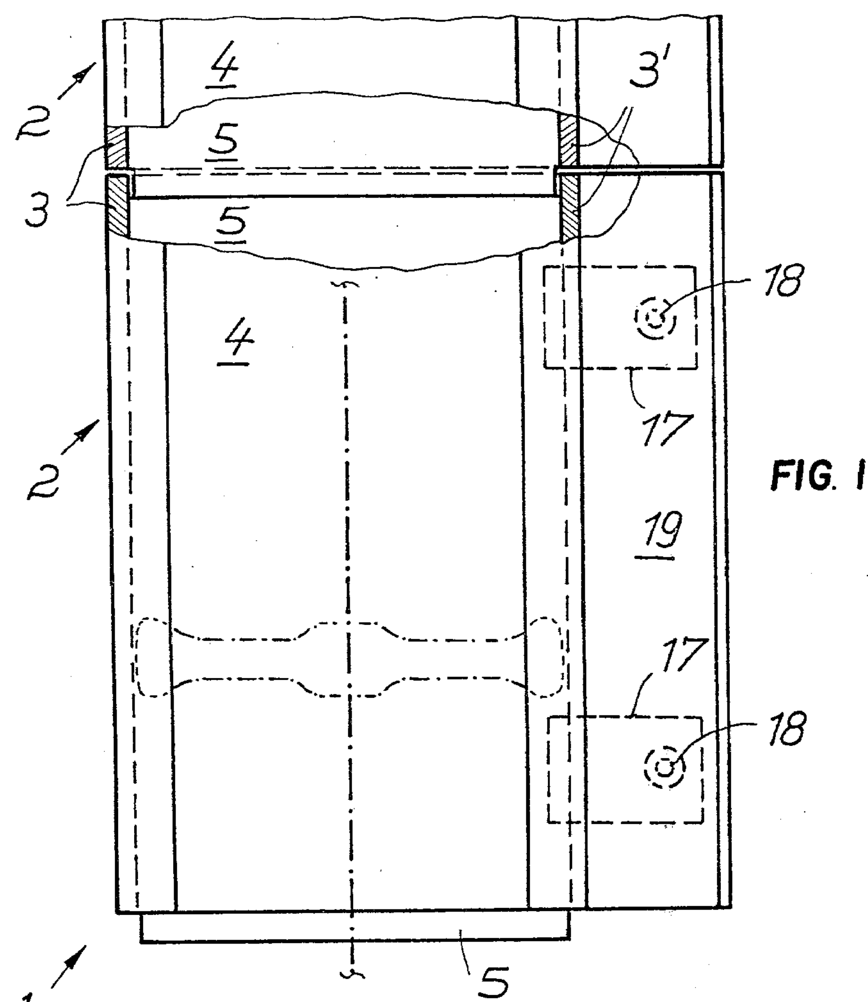
FIG. 1 is a schematic top plan view of a conveyor chute, partly broken away, constructed in accordance with the present invention.
Figure 5:
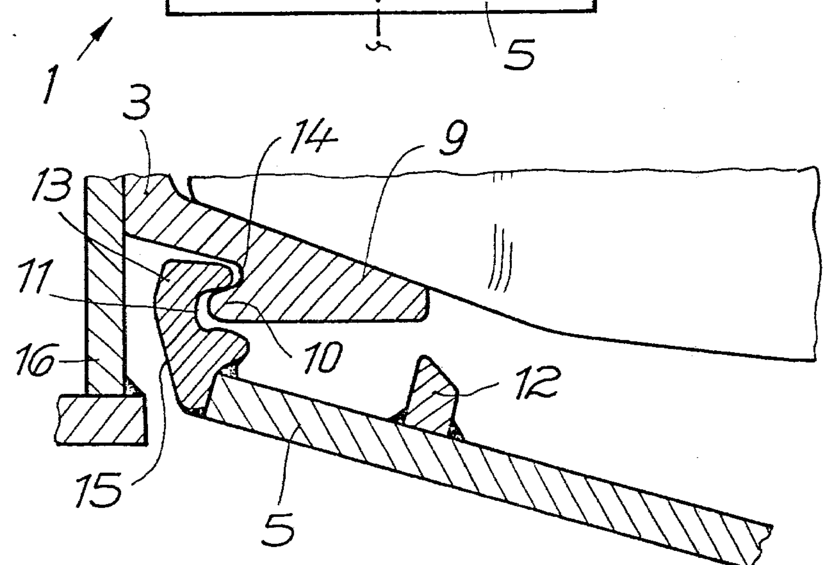
FIG. 5 is an enlarged sectional view showing the manner in which the baseplate is pivotally hinged to the sidewall foot portion.

Referring to the drawings in particular, the invention embodied therein, comprises, a chute for chain scraper conveyors which are adapted to overlie a floor 22 of a mining seam. The drawings show a conveyor chute 1 for chain scraper conveyors, in particular a single chain scraper conveyor, which includes two sections 2 and 2' which are hinged to each other. Sidewalls 3 of each chute section 2 are connected to an intermediate or bottom plate 4 and a baseplate 5, with the bottom plate 4 dividing the chute section 2 into upper and lower stringers 6 and 7, respectively.

The baseplate 5 rests on the floor 22 of the mining seam. The sidewall 3, on the forehead side of each chute section 2 has a chute foot 9 with a male hinge portion or section 10 which is set back under the side section on the outside of the chute. The baseplate 5 has a female hinge portion or section 11 on the forehead side, into which the male hinge section 10 engages, with a specified clearance. A stop 12 is located on the plate 5 and is coordinated with the chute foot 9 on the inside of the chute.

The male hinge section 10 is designed as a male section integrally rolled onto the sidewall 3, thereby, stiffening the sidewall, while the female hinge section 11 is designed as a female section 13 welded to the baseplate 5. Both sections extend over the length of the chute section 2. The sidewall 3 on the forehead side has a recess 14 above the male section or male hinge section 10, for the partial accommodation of the female section 13 for the hinged tilting of the chute section 2.

Figures 2, 3, 4:
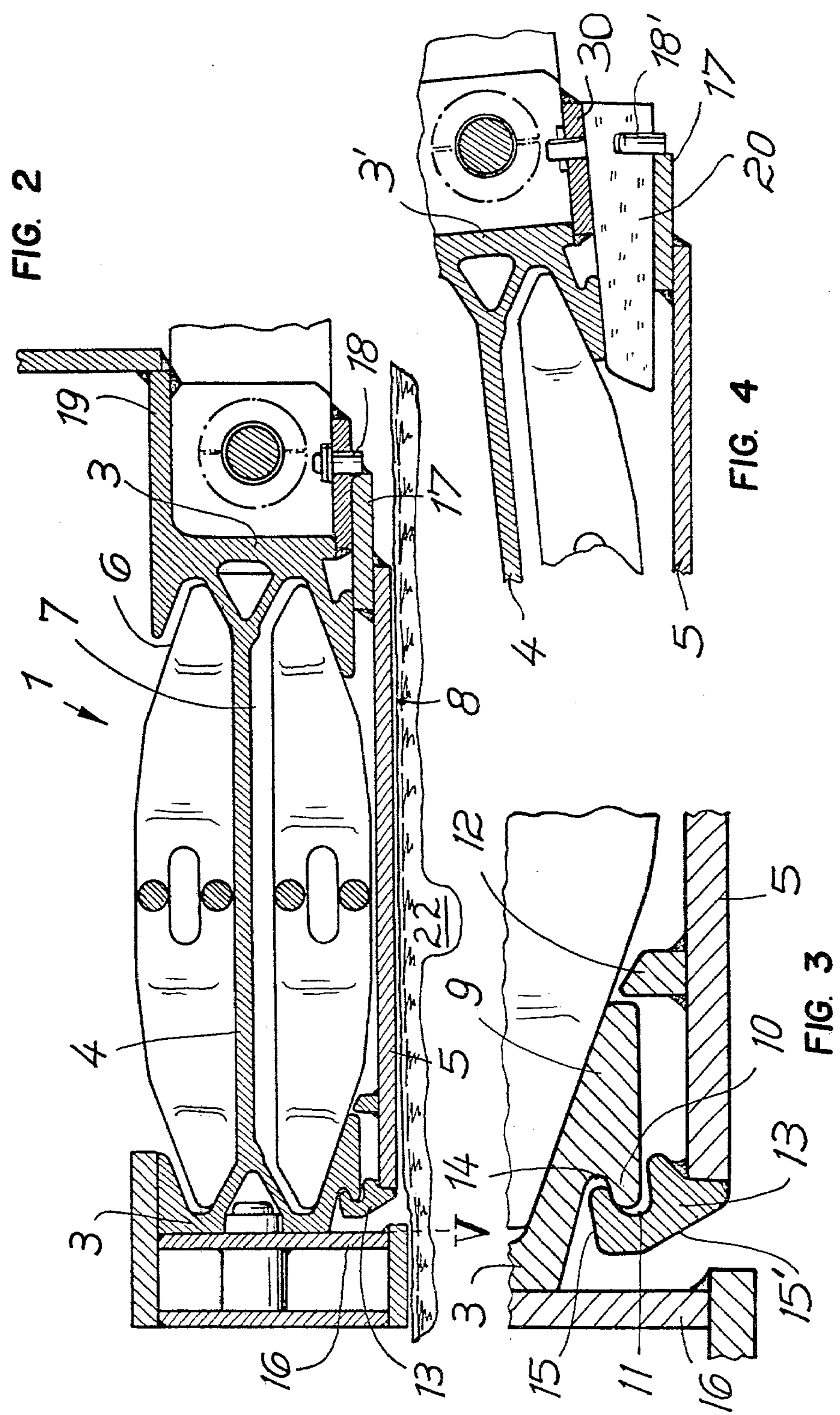
FIG. 2 is an enlarged transverse sectional view of the conveyor chute shown in FIG. 1.
FIG. 3 is an enlarged partial section of a portion of the conveyor chute shown in FIG. 2.
FIG. 4 is a view similar to FIG. 3 of the opposite portion of the conveyor shown in FIG. 2.

The female section 13 has a profiled or bevelled top 15 and a bevelled bottom edge 15' which taper downwardly so that the female section 13 does not project beyond the vertical plane V (FIG. 2) during tilting motion and, consequently, cannot interfere with accessories screwed to the sidewall 3. The stop 12 for the chute foot 9 is designed as a profiled bar.

The baseplate 5 has an extension 17 on the filling side which projects beyond the vertical projection of the sidewall section 3, and is connectable by detachable pins 18 to a base frame 19 joined to the sidewall 3'. Pins 18 may be cotters, or locking pins. The extension 17 comprises a plurality of longitudinally spaced plates welded to the baseplate 5 in the butting zones of the chute section 2. The baseplates 5 of adjacent chute sections 2 overlap.

In addition, each chute section 2 may have additional locking means for the baseplate at its abutting ends, but this is not shown. A tapered shim 20 may be locked in position between the extension 17 and a bottom 30 of the sidewall 3', so as to determine the position of this side of the chute relative to the plate 5.

While specific embodiments of the invention have been shown and described in detail to illustrate the application of the principles of the invention, it will be understood that the invention may be embodied otherwise without departing from such principles.

What is claimed is:

1. A conveyor chute for chain scraper conveyors, which are adapted to overlie a floor of a mining seam, comprising, a plurality of chute sections arranged in end-to-end relationship, each chute section having laterally spaced apart forehead and filling side sidewalls, a bottom plate extending between said sidewalls and dividing each chute section into upper and lower stringers, said forehead side sidewall having a foot portion forming a flat bottom extending outwardly of the associated sidewall toward the opposite sidewall and including a recess above the flat bottom and a male hinge portion below the recess, a baseplate extending between said sidewalls having a female hinge portion secured along one end thereof with a female recess into which said male portion extends, said hinge portion including a bevelled top edge and a bevelled bottom edge both outwardly facing said forehead sidewall which permits the pivotal movement of said baseplate.

2. A conveyor chute according to claim 1, wherein said female portion has bevels on its top and bottom which are slanted downwardly.

3. A conveyor chute according to claim 1, including a stop formed on said plate in the form of an upstanding bar disposed along the lateral edge of said foot portion.

4. A conveyor chute, according to claim 1, including an extension on said baseplate along the side thereof adjacent said filling side sidewall and detachable fastener means connecting said extension plate to said filling side sidewall.

5. A conveyor chute according to claim 4, wherein said extension comprises a projecting plate and said fastening means comprises a fastening pin extending upwardly from said plate and a tapered shim disposed above said plate and between said plate and said filling side sidewall.

6. A conveyor chute according to claim 1, wherein each of said sections includes a separate baseplate which overlaps the adjacent chute section.

7. A conveyor chute according to claim 1, wherein at least said filling side sidewall has a plurality of locking means for said baseplate.

* * * * *